United States Patent
Marmo et al.

(10) Patent No.: US 6,838,007 B2
(45) Date of Patent: Jan. 4, 2005

(54) REMOTE SITE CHLORINATOR SYSTEM

(76) Inventors: A. Robert Marmo, 102 Wye Oake Dr., Cheswick, PA (US) 15024; David E. McConahy, 965 Saxonburg Blvd., Saxonburg, PA (US) 16056

( * ) Notice: Subject to any disclaimer, the term of this patent is extended or adjusted under 35 U.S.C. 154(b) by 46 days.

(21) Appl. No.: 10/361,879

(22) Filed: Feb. 11, 2003

(65) Prior Publication Data

US 2004/0154996 A1 Aug. 12, 2004

(51) Int. Cl.[7] ................................................. C02F 1/76
(52) U.S. Cl. ..................... 210/754; 210/756; 210/198.1; 422/263
(58) Field of Search ................................. 210/754, 756, 210/198.1, 205, 169, 416.2; 422/261, 263, 282; 137/268

(56) References Cited

U.S. PATENT DOCUMENTS

| | | | | |
|---|---|---|---|---|
| 5,447,641 A | * | 9/1995 | Wittig | 210/756 |
| 5,637,230 A | * | 6/1997 | Billings | 210/739 |
| 5,827,434 A | * | 10/1998 | Yando | 210/754 |
| 6,337,024 B1 | * | 1/2002 | Hammonds | 210/739 |
| 2002/0195404 A1 | * | 12/2002 | Pickens et al. | 210/755 |

* cited by examiner

Primary Examiner—Frank M. Lawrence

(57) ABSTRACT

This invention is directed to a chlorinator system useful for disinfecting water. This invention is especially useful for controlling the addition of a chlorine source to disinfect a drinking water supply which is situated at a remote location wherein electricity is unavailable.

6 Claims, 1 Drawing Sheet

REMOTE SITE CHLORINATOR FLOW DIAGRAM

REMOTE SITE CHLORINATOR SYSTEM

TECHNICAL FIELD OF THE INVENTION

This invention is directed to a chlorinator system useful for chlorinating water. This invention is especially useful for controlling the addition of a chlorine material to disinfect a drinking water supply which is situated at a remote location.

BACKGROUND OF THE INVENTION

The chlorinator systems known in the art can be expensive, undependable, inaccurate, and difficult to operate and maintain. Thus, there is a need in the art to develop a chlorinator system which can disinfect a drinking water supply in a safe, accurate, inexpensive, dependable manner, while being easy to operate and maintain.

SUMMARY OF THE INVENTION

The present invention includes a method of controlling the amount of chlorine material present in an aqueous steam, comprising the steps of: (a) providing a chlorine concentrate tank having therein a source of chlorine; (b) providing a first aqueous stream; (c) dividing said first aqueous stream into a second and a third aqueous stream; (d) introducing said second aqueous stream into said chlorine concentrate tank and into contact with said chlorine source; (e) introducing said third aqueous stream into a bypass line; (f) removing a fourth aqueous stream from said concentrate tank containing said chlorine material; (g) combining said third aqueous stream from said bypass line with said fourth aqueous stream from said concentrate tank to form a fifth aqueous stream; and (h) introducing said fifth aqueous stream into a detention tank wherein said chlorine material is allowed to sufficiently react; and (i) removing a sixth aqueous stream from said detention tank wherein said sixth aqueous stream has a free chlorine content of from 0.3 to 2.0 ppm.

DETAILED DESCRIPTION OF THE INVENTION

Figure 1:
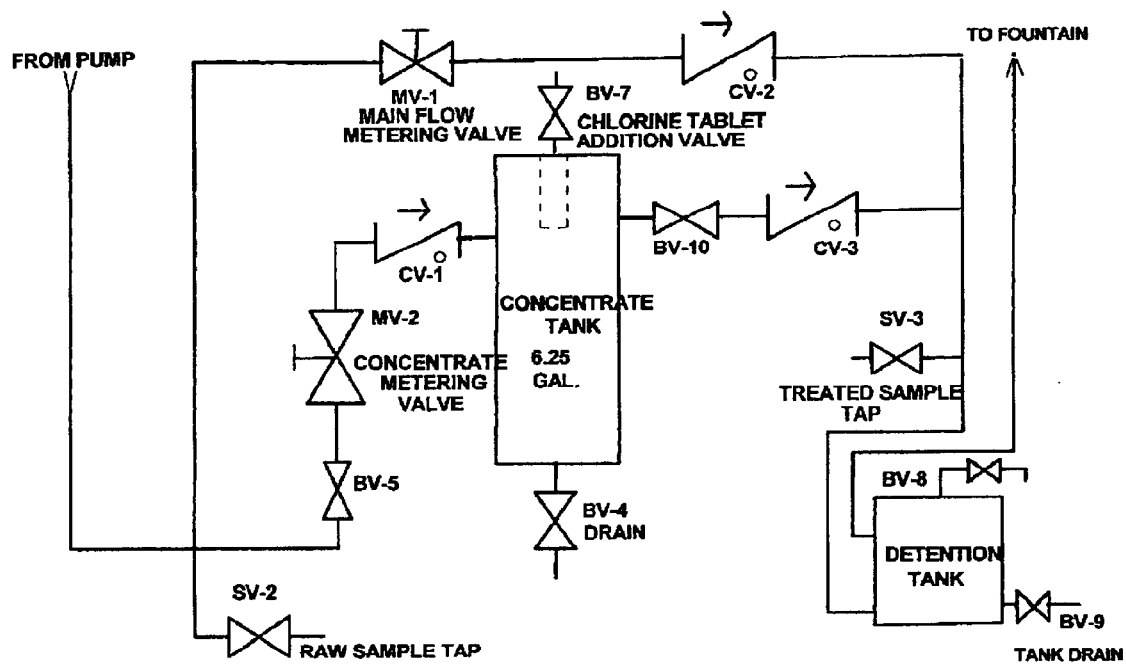
FIG. 1 contains a schematic flow diagram of the chlorinator system of the present invention.

The present invention is directed to a chlorinator system for controlling the addition of a chlorine material into a water stream. In a non-limiting embodiment, the chlorinator system can be used to chlorinate and/or disinfect a drinking water supply. In a further non-limiting embodiment, the chlorinator system can be used to disinfect a drinking water supply which is situated in a remote location. As used herein and the claims, the term "remote" refers to a location wherein electrical power is not easily or economically available, or wherein electrical power is unavailable. In a non-limiting embodiment of the invention, the chlorinator system is a pressurized self-contained system.

In general, the chlorinator system of the present invention can be used to controllably add chlorine to an aqueous stream. In a non-limiting embodiment, the chlorinator system can add chlorine material to a stream of water pumped from a water supply. The water supply can be a drinking water supply such as but not limited to a well. The water flows into the chlorinator system by means of hydrostatic pressure produced by the pump, such as but not limited to a hand pump, in the water supply. The chlorinator system includes piping, a chlorine concentrate tank, a chlorinated water detention tank and various valves. In a non-limiting embodiment, suitable material for the piping can include but is not limited to polyvinyl chloride (PVC) and stainless steel.

At least a portion of the water can then flow into an inlet line to the chlorine concentrate tank. The inlet line piping can contain a means of preventing backflow from the concentrate tank. Such means can include but is not limited to a flow check valve. The inlet line to the chlorine concentrate tank can also include a means of adjusting the flow rate of the water to the concentrate tank, such as but not limited to a metering valve. The inlet line to the chlorine concentrate tank can also include a means of preventing the back flow of water from the concentrate tank, such as but not limited to a check valve. Further, the inlet line to the chlorine concentrate tank can include a means for collecting a water sample for analysis or inspection. Such means can include but is not limited to a sampling tap valve. Suitable valves for use in the present invention are commercially available from McMaster-Carr Supply Company as Part Number 22134.

In a non-limiting embodiment, the block valve (2) is located downstream of the sampling tap valve (1), the metering valve (3) is located downstream of the block valve (2), and the flow check valve (4) is located downstream of the metering valve (3).

The inlet line to the chlorine concentrate tank can contain a bypass line. At least a portion of the water pumped into the chlorinator system from the water supply can flow into the bypass line. In a non-limiting embodiment, the bypass line can be routed to combine with the discharge flow stream from the chlorine concentrate tank, and then to the detention tank. The bypass line can contain a means of adjusting the flow rate in the piping, such as but not limited to a metering valve. Further, the bypass line can include a means of preventing backflow from the detention tank, such means can include a flow check valve. The bypass line can also include a means of sampling the water from the bypass line prior to entering the detention tank, such as but not limited to a sample tap valve. The sample obtained at this connection can be used to verify the chlorine content of the water. In a non-limiting embodiment, the sample tap valve can be located downstream of the flow check valve, which is located downstream of the metering valve.

In a non-limiting embodiment, water can be pumped from the water supply through a diverter chamber and into the chlorinator system of the present invention. The water can then be divided into a stream that can flow to the chlorine concentrate tank and another stream that can flow into the bypass line. The water in the bypass line can bypass the chlorine concentration tank and can be combined with the discharge flow from the concentrate tank.

The chlorine concentrate tank comprises a feeder having therein a source of chlorine. Non-limiting examples of suitable chlorine sources can include calcium hypochlorite, sodium hypochlorite, potassium hypochlorite, lithium hypochlorite, and mixtures thereof. In a non-limiting embodiment, the chlorine source can be calcium hypochlorite.

The size of the chlorine concentrate may vary widely. In a non-limiting embodiment, the chlorine concentrate tank can be sized such that it is large enough to hold the water necessary to dissolve the calcium hypochlorite tablets to the desired concentration. In a non-limiting embodiment, the chlorine concentrate tank can comprise about a 33-inch length of 8" dia. PVC Schedule 40 pipe having end caps. Suitable materials for the chlorine concentrate tank can include but are not limited to PVC Schedule 40 pipe. The concentrate tank can include a means for adding the chlorine into the tank. In a non-limiting embodiment, the top of the concentrate tank is fitted with an inlet connection valve which can open to allow for the addition of chlorine tablets into the concentrate tank. Suitable inlet connection valves can include but are not limited to a one-inch ball valve. The calcium hypochlorite tablets enter the concentrate tank through the one inch ball valve and can be aligned using a perforated PVC disc at the end of the inlet pipe. The calcium hypochlorite tablets will dissolve in the presence of the water, allowing the chlorine to go into solution. The bottom of the concentrate tank can include a drain port with a means for allowing the contents of the tank to be drained for cleaning or shutdown, such means can include a block valve.

In general, untreated water flows into the inlet of the chlorine concentrate tank and the untreated water can be doped with chlorine from the dissolved calcium hypochlorite tablets. The doping rate of the calcium hypochlorite can vary depending on the amount and content of the untreated water and the desired chlorine content of the treated water. In a non-limiting embodiment, the initial doping rate can be for three (3) standard 0.75" diameter calcium hypochlorite tablets to be dissolved into 6.75 gallons of water in the concentrate tank. Suitable calcium hypochlorite tablets for use in the invention are commercially available from PPG Industries, Inc. This doping rate can provide a concentrate to be added into the untreated water stream to yield a free chlorine concentration that is acceptable for drinking water standards. In a non-limiting embodiment, the untreated water in the bypass line can combine with the chlorine-containing water stream discharged from the concentrate tank, and the resulting water stream then can be introduced into the detention tank for an appropriate period of time, and the discharge water stream from the detention tank can contain a free chlorine concentration that is desirable for drinking water. In a further non-limiting embodiment, the free chlorine concentration in the water stream discharged from the detention tank can be from about 0.3 to about 2.0 ppm. In a further non-limiting embodiment, a 50 to 1 doping ratio can yield 1.5 ppm free chlorine in the discharge flow stream from the detention tank. The doping ratio is the amount of chlorine concentrate to the amount of untreated water. In a non-limiting example, one gallon of chlorine concentrate can be used to treat 50 gallons of untreated water at 1.5 ppm free chlorine.

The discharge line from the concentrate tank can be connected to the bypass line such that the aqueous stream in the discharge line is combined with the aqueous stream in the bypass line. A means of preventing backflow to the concentrate tank can be included in the discharge line, such means can include a flow check valve. The discharge line can also include a means to prevent a forward flow leak during tablet addition to the concentrate tank, such means can include a block valve in the concentrate discharge line. In a non-limiting embodiment, the block valve can be located upstream of the flow check valve.

The water in the chlorinator system can flow from the outlet of the chlorine concentrate tank, combine with a water stream from the bypass line and then into a detention tank. The water is contained in the detention tank for an appropriate period of time to allow the chlorinator source, such as calcium hypochlorite, to sufficiently react to produce safe drinking water. The size of the detention tank can vary depending on the amount of water delivered to the tank. In a non-limiting embodiment, the detention tank can be about a 30-gallon tank. The time period during which the water is contained in the detention tank can also vary depending on the amount of water, the desired chlorine concentration and the size of the detention tank. In a non-limiting embodiment, the water is contained in a 30-gallon detention tank for a period of from fifteen (15) to thirty (30) minutes. The chlorinated water is then discharged from the detention tank into a discharge pipe. The discharge pipe can be connected to a drinking water supply, such as a fountain.

A suitable detention tank for use in the invention can include a Teel 30 gallon water tank available as part number 3P557. In a non-limiting embodiment, the detention tank is an epoxy-lined tank.

The top of the detention tank can include a means of bleeding off air during the initial fill cycle, such means can include the detention tank being fitted with a standpipe and a block valve. The bottom of the detention tank can include a means for draining the contents of the detention tank for cleaning or shutdown, such means can include a block valve.

The concentration of the free chlorine in the discharge of the concentrate tank can be controlled by calibrating the metering valves under dynamic pumping conditions with the water supply pump. The calibration can be carried out by methods known in the art. In a non-limiting embodiment, the calibration can be performed by connecting the chlorinator system of the invention to a Baker Monitor hand pump and the pump input supplied with a source of untreated water. The hand pump is actuated and the metering valves are set to provide an essentially constant free chlorine level of from about 1 to 1.5 ppm in the effluent water. Following completion of the calibration process, a series of samples are taken at various pump rates to simulate typical strokes per minute that could occur during use. This confirms that, regardless of the pumping rate, the chlorine content remains within acceptable limits.

In an embodiment, the water supply pump is a hand pump.

In a further non-limiting embodiment, a 400 cc sample is obtained from the treated sample tap and the sample is allowed to set such that the water and the calcium hypochlorite sufficiently react to disinfect the water. In a non-limiting embodiment, the sample is allowed to set for about one (1) minute. The amount of free chlorine can be monitored using commercially available test strips, such as AquaChek test strips made by Environmental Test Systems, Inc.

FIG. 1 illustrates a non-limiting embodiment of the present invention. In reference to FIG. 1, an aqueous steam is pumped from the water supply into the chlorinator system. The aqueous stream flows into the chlorinator system and can then flow into the inlet line of the chlorine concentrate tank (8) or the bypass line. In the bypass line, the aqueous stream flows through the metering valve (5) and then the flow check valve (7) and into the detention tank (14). In the inlet line to the chlorine concentrate tank (8), the aqueous stream flows through the block valve (2), the metering valve (3) and the flow check valve (4), into the top of the chlorine concentrate tank. The aqueous stream then flows through the concentrate tank into the outlet line of the concentrate tank. The top of the concentrate tank is fitted with an inlet connection containing a block valve (6). The bottom of the concentrate tank is fitted with a drain port containing a block valve (12). The outlet line piping contains a block valve (9) and a flow check valve (10). The aqueous stream flows from the outlet line into the bypass line. A sample of the treated water can be obtained from the sample tap valve (11) which can be located in the piping upstream of the detention tank (14). The aqueous stream then flows from the bypass valve into the detention tank (14). The detention tank (14) can be fitted with a standpipe containing a block valve (15). The bottom of the detention tank (14) can be fitted with a drain pipe containing a block valve (13).

Further, a sample of the untreated aqueous stream flowing into the chlorinator system can be obtained through the sample tap valve (1).

In a non-limiting embodiment, the chlorinator system can be installed in a pit near the well-head of a well water supply. After the chlorinator system has been placed on-line, periodic samples can be obtained to verify the chlorine concentration. The sampling interval can vary with usage but a typical chlorinator system can be tested at least once every two weeks. When the chlorine level drops below about 0.3 ppm, calcium hypochlorite can be recharged to the concentrate tank. In a non-limiting embodiment, the concentrate tank is recharged with calcium hypochlorite by removing the seal cap on the tank, relieving any residual pressure on the system, opening the one inch ball valve, adding two (2) tablets and then closing the valve. The tablets can typically dissolve in about twelve hours or less and the system can then be retested.

The present invention has been described with reference to specific details of the preferred embodiment thereof. It is not intended that such details be regarded as limitations upon the scope of the invention except insofar as and to the extent that they are included in the aforementioned claims.

We claim:

1. A method of controlling the amount of chlorine source present in an aqueous stream, comprising the steps of:

(a) providing a chlorine concentrate tank having therein a source of chlorine;

(b) providing a first aqueous stream;

(c) dividing said first aqueous stream into a second and a third aqueous stream;

(d) introducing said second aqueous stream into said chlorine concentrate tank and into contact with said chlorine source;

(e) introducing said third aqueous stream into a bypass line;

(f) removing a fourth aqueous stream from said concentrate tank containing said chlorine source;

(g) combining said third aqueous stream from said bypass line with said fourth aqueous stream from said concentrate tank to form a fifth aqueous stream;

(h) introducing said fifth aqueous stream into a detention tank wherein said chlorine source is allowed to sufficiently react with said aqueous stream;

(i) and removing a sixth aqueous stream from said detention tank wherein said sixth aqueous stream has a free chlorine content of from 0.3 to 2.0 ppm;

wherein said method operates strictly from the pressure generated from the action of a hand pump and requires no electricity.

2. The method of claim 1 wherein said chlorine source is selected from the group consisting of calcium hypochlorite, sodium hypochlorite, potassium hypochlorite, lithium hypochlorite, or mixtures thereof.

3. The method of claim 1 wherein said chlorine source is calcium hypochlorite.

4. A system for adding a chlorine material into a water stream comprising:

(a) a chlorine concentrate tank for holding a sufficient amount of water, wherein said tank comprises an inlet pipe for adding solid chlorine tablets to said tank, and wherein said tablets are dissolved in said water;

(b) a regulating means for adding a portion of said tank water to a water stream flowing through said tank; and (c) a detention tank for holding water discharged from said concentrate tank, wherein said discharged water is held to allow a sufficient reaction of chlorine with water such that water discharged from said detention tank has a free chlorine content of from 0.3 to 2.0 ppm;

wherein said system operates strictly from the pressure generated from the action of a hand pump and requires no electricity.

5. The system of claim 4 wherein said system is a closed, pressurized system.

6. The system of claim 4 wherein said system incorporates a method of verifying the chlorine content of the water.

* * * * *